(12) United States Patent
Villanucci et al.

(10) Patent No.: US 7,938,010 B2
(45) Date of Patent: May 10, 2011

(54) PASSIVE, REMOTE SENSOR

(75) Inventors: Dennis Peter Villanucci, Chelmsford, MA (US); Peter Nicholas Baum, Chelmsford, MA (US); Ilya Schiller, Brookline, MA (US)

(73) Assignee: Visidyne, Inc., Burlington, MA (US)

( * ) Notice: Subject to any disclaimer, the term of this patent is extended or adjusted under 35 U.S.C. 154(b) by 428 days.

(21) Appl. No.: 11/975,264

(22) Filed: Oct. 18, 2007

(65) Prior Publication Data

US 2008/0135762 A1  Jun. 12, 2008

Related U.S. Application Data

(60) Provisional application No. 60/853,543, filed on Oct. 23, 2006.

(51) Int. Cl.
 *G01D 5/32* (2006.01)
(52) U.S. Cl. ....................................................... 73/655
(58) Field of Classification Search .................. 73/655, 73/579, 643, 601, 587
 See application file for complete search history.

(56) References Cited

U.S. PATENT DOCUMENTS

| | | | | |
|---|---|---|---|---|
| 5,420,379 | A * | 5/1995 | Zank et al. | 178/19.03 |
| 6,232,910 | B1 * | 5/2001 | Bell et al. | 342/70 |
| 6,400,308 | B1 * | 6/2002 | Bell et al. | 342/71 |
| 6,520,308 | B1 * | 2/2003 | Martin et al. | 194/317 |
| 6,766,892 | B2 * | 7/2004 | Martin et al. | 194/317 |
| 7,213,697 | B2 * | 5/2007 | Martin et al. | 194/317 |

* cited by examiner

*Primary Examiner* — Hezron Williams
*Assistant Examiner* — Rodney T Frank
(74) *Attorney, Agent, or Firm* — Iandiorio Teska & Coleman (57) ABSTRACT

A passive, remote sensor including an optical subsystem for receiving electromagnetic radiation scattered off a surface. A detector is responsive to electromagnetic radiation received by the optical subsystem and generates a composite signal comprising a DC current component and an AC current component. A filter extracts the DC current component from the composite signal. A light emitting device is driven by the DC current component. A detector is responsive to the light emitting device and is connected to the first detector to subtract at least a portion of the DC component from the composite signal producing a modified signal. An amplifier is responsive to the modified signal detects vibrations of the surface to be detected.

11 Claims, 10 Drawing Sheets

Modulated optical signal reflected off the wall vibrated by a 100 Hz audio signal. Co-added multiple power spectra to improve signal-to-noise on the 100 Hz tone measurement demonstrates 3000:1 signal to noise ratio.

*FIG. 3*

Remote Passive Seismometer measurement of a wall vibrated by an acoustic tone that started at about 165 Hz and then reduced to 140 Hz. The presence of signals from both AC line noise and fluorescent light are also evident at 60 and 120 Hz.

PASSIVE, REMOTE SENSOR

RELATED APPLICATIONS

This application claims benefit of and priority to U.S. Provisional Application Ser. No. 60/853,543 filed Oct. 23, 2006, which is incorporated herein by reference.

FIELD OF THE INVENTION

This invention relates to an electro-optical sensor.

BACKGROUND OF THE INVENTION

There is a need to detect mechanical vibrations caused by various sources including sound from a distance. One application includes the covert detection of voices in a room. A laser vibrometer or "laser microphone" is known (at least in theory) wherein a laser beam strikes a vibrating window due to people talking or a speaker operating in a room. The laser beam is split and a detector is responsive to both the split beam and the beam reflected off the window. Using interferometry, the sounds causing the surface (e.g., a window) to vibrate, can be reconstructed.

There are numerous problems associated with such an approach including the need for an active laser, accounting for differences in beam leg length, and the need for complex hardware, circuitry, and software.

BRIEF SUMMARY OF THE INVENTION

It is therefore an object of this invention to provide a passive, remote sensor and method.

It is a further object of this invention to provide such a sensor which can allow for the remote observation of surfaces such as walls, solar panels, window panes, floors, ceilings, auto body skin, windows, foliage and other structured vibrations.

It is a further object of this invention to provide such a sensor and method which can result in secure "passive" communications ship to ship, ship to shore, or ground to ground through the use of observing a vibrating reflective panel.

It is a further object of this invention to provide such a sensor and method which allows clandestine monitoring and detection and recovering of voices in a room, building, vehicle, or other structure.

It is a further object of this invention to provide such a sensor and method which can be deployed on the ground or in connection with aircraft or other airborne devices or a satellite to detect foliage vibrations and/or canopy monitoring of equipment operation or other interesting signatures hidden under a canopy.

It is a further object of this invention to provide such a sensor and method which can be used to monitor rotating machinery inside an enclosure, building or structure.

It is a further object of this invention to provide such a sensor and method which can be used to detect underground human activities in structures or caves.

It is a further object of this invention to provide such a passive, remote sensor system and method which can be used to monitor tunnel entrances, buildings, and the like.

It is a further object of this invention to provide such a sensor which can be made small, portable, battery operated and still have a range of 500-1,000 feet or greater.

It is a further object of this invention to provide such a sensor and method which can be used to identify different types of automotive engines or even individual cars by their unique signature observed remotely.

It is a further object of this invention to provide such a sensor and method which operates in the presence of direct sunlight, diffuse skylight scattering, moon and/or starlight, city or streetlights and/or other man made sources (e.g., lasers, light emitting diodes, thermal devices, and the like) as the illumination source.

It is a further object of this invention to provide such a sensor and method which operates in the ultraviolet, visible, infrared radiation, or terahertz wavelengths.

It is a further object of this invention to provide such a sensor and method which can be used in combination with a solar blind ultraviolet illuminator, NUV illuminator, far infrared or terahertz radiator.

It is a further object of this invention to provide such a sensor and method which is able to detect vibrations using natural radiation of objects (e.g., thermal radiation) without any external illumination sources.

This subject invention features a passive, remote sensor comprising an optical subsystem for receiving electromagnetic radiation scattered off a surface. A detector is responsive to electromagnetic radiation received by the optical subsystem and generates a composite signal comprising a DC current component and an AC current component. A filter extracts the DC current component from the composite signal. A light emitting device is driven by the DC current component and a detector is responsive to the light emitting device and is connected to the first detector to subtract at least a portion of the DC component from the composite signal producing a modified signal. An amplifier is responsive to the modified signal for detecting vibrations of the surface.

In one example, the detectors are photodetectors and the light emitting device is a light emitting diode. The sensor may further include a fixed gain low pass filter responsive to the modified signal or a variable gain low pass filter responsive to the modified signal. One suitable optical subsystem includes a telescope.

One passive, remote sensor in accordance with the subject invention includes an optical subsystem for receiving electromagnetic radiation scattered off a surface, at least a first detector responsive to electromagnetic radiation received by the optical subsystem and generating a composite signal comprising a DC current component and an AC current component, a DC current removal circuit for removing at least a portion of the DC current component of the composite signal producing a modified signal, and an amplifier responsive to the modified signal for detecting vibrations of the surface.

An example of a DC current removal circuit includes a light emitting device driven by the DC current component and a second detector responsive to the light emitting device and connected to the first detector to subtract at least a portion of the DC component from the composite signal producing the modified signal.

The subject invention also features a method of passively and remotely measuring vibrations based on electromagnetic radiation scattered off a vibrating surface. One preferred method includes directing the electromagnetic radiation to a detector which generates a composite signal in response comprising a DC component and an AC component. The DC component is removed to produce a modified signal and the modified signal is amplified to detect vibrations of the surface.

The vibrations of the surface can be used to detect acoustic waves which vibrate the surface; the surface can be vibrated to establish a communication channel between the surface and the detector, and/or the vibrations of the surface can be used to detect non-acoustic waves which vibrate the surface. The electromagnetic radiation can be sunlight, moonlight, starlight, electrical light, ultraviolet light, infrared radiation, or natural radiation.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The subject invention relates to an electro-optical sensor that remotely detects acoustic and mechanical vibrations transmitted through walls, ground, vehicles and vegetation. This passive, optical sensor can contribute significantly to intelligence gathering of temporal acoustic and vibration signals at large stand-off distances. Experiments to date have demonstrated the ability to optically detect local acoustic signals from building and car interiors by observing exterior walls, windows, the body of a car, and even from tree leaves. Voices have also been detected using this technique and audio signals have been reconstructed.

Commercial uses would include security and surveillance applications where passive detection is a priority. A further application would be in making real-time, non-contact measurement of the operating state of heavy machinery where physical access is not practical, as in a hazardous environment.

An instrument in accordance with this invention can measure not only glint signatures, but also those produced by diffuse radiation reflected from a surface, from which acoustic and vibration signals can be recovered in almost any lighting conditions. This is achieved by being able to operate the instrument at the high dynamic range required to recover the small, fractional signal modulations.

The sensor is a unique electro-optical device that can remotely detect the frequency content embedded in amplitude modulation of diffuse light scattered off of a surface. It uses a passive, staring, sensor to detect vibration transmitted through walls, ground, trees, vehicles and people. This sensor can contribute significantly to intelligence gathering capabilities by using diffuse radiation for the detection of temporal acoustic and vibration signals at significant stand-off distances.

One example of a sensor system includes a radiometer with a single 3 mm diameter silicon detector. The radiometer provides spectral response from 0.4 through 1.0 micrometers (the visible band and near infrared). A second example used a GaAs detector covering the spectral region from 1 to 1.6 microns. The radiometer uses several optical front-ends, providing different fields of view ranging from (but not limited to) 8 to less than 1 degree.

The detector signal is amplified may be collected using a 16 bit A/D converter that is controlled from software that provides real-time display and recording of the radiometer time series output. The signal may be currently sampled at 10 kHz, allowing detection of modulated signals up to the Nyquist limit of 5 kHz; higher recording rates (to 100 kHz and beyond) are possible for this system.

One feature of the sensor is the ability to measure AC signal that is being detected is in the presence of a high DC background. This is achieved by electronically subtracting most of the DC photocurrent prior to the amplifier leaving the AC signal to be amplified without overload. In one embodiment, the sensor uses an integrating feedback loop that drives a light emitting diode, LED. The LED illuminates a second photodiode connected to the first in such a way that it subtracts the DC photocurrent. A photodiode was used for the subtraction because it is a high resistance low leakage device that works at zero volts. A transistor can also be used in place of the LED and second photodiode to make the receiver less expensive and easier to manufacture. Transistors, however, require voltage and have higher leakage current. The sensor is designed to have exceptional pointing stability, very large dynamic range and linear response to enable efficient detection of the weakest signals without distortion. AC coupling allows one to use the rather limited dynamic range of an existing photodiode sensor to detect signals that are many orders of magnitude below the DC background.

Figure 1:
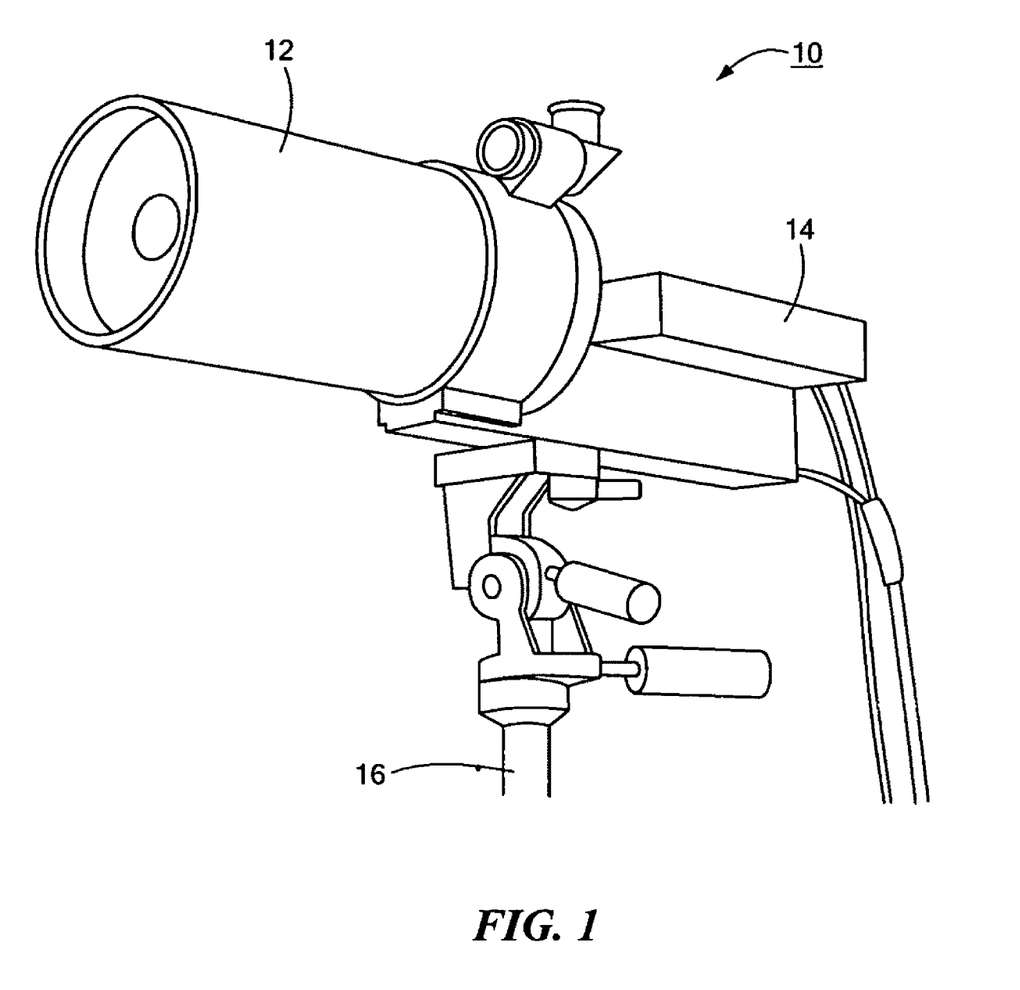
FIG. 1 is a schematic three-dimensional view showing an example of a sensor system in accordance with the subject invention.
Figure 2:
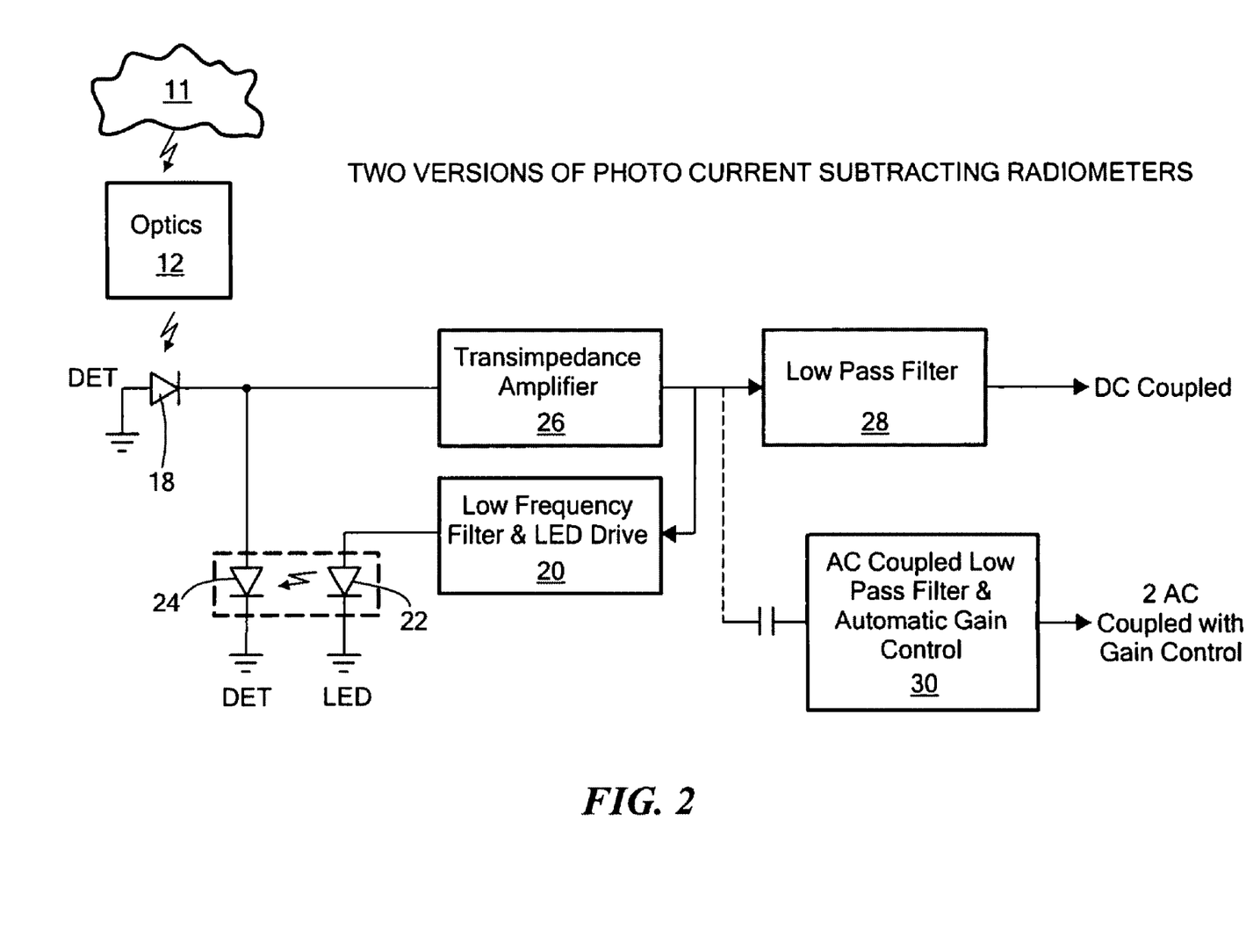
FIG. 2 is a highly schematic block diagram showing the primary components associated with the sensor system of FIG. 1.

FIG. 1 shows an example of a sensor 10 in accordance with the subject invention. In this example, optical subsystem 12 is a telescope (e.g., a 1900 mm Meade telescope) which receives electromagnetic radiation (e.g., visible light) scattered off a surface. The circuitry of FIG. 2 is housed within unit 14, FIG. 1 mounted on tripod 16. Photodetector 18, FIG. 2 is responsive to electromagnetic radiation scattered off surface 11 (a window, leaves, or the like) received by optical subsystem 12 and generates a composite signal comprising a DC current component and an AC current component. A DC current removal circuit such as low frequency filter and LED driver 20 extracts the DC current component from the composite signal and drives Light Emitting Diode (LED) 22 using the DC current component. Photodetector 24 is located to be responsive to LED 22 and is connected to photodetector 18 as shown to subtract at least a portion of the DC component from the composite signal producing a modified signal supplied to transimpedance amplifier 26. Either a fixed gain low pass filter 28 or an AC coupled low pass filter 30 with automatic gain control allows measurement of the vibrations of surface 11.

Measurements were made that demonstrated conclusively that the observed modulation was not due to sensor motion induced by audio through the air or vibrations through the ground. The sensor background signal, taken with the input optics blocked has also been measured to demonstrate that the observations are not caused by electromagnetic pickup or microphonics.

Numerous experiments were conducted successfully that measured acoustic vibration at distances up to 4000 feet. The radiometer is packaged to minimize electromagnetic pickup and uses batteries for power. Sensor vibration was eliminated to avoid sensor jitter caused by the audio and vibration signals directly moving the sensor (and hence the sensor field-of-view) contaminating acoustic detections. The sensor was placed on a tripod with vibration-isolated blocks used by astronomers and additional stiff foam. For use on an aircraft, for example, a jitter stabilization platform may be required.

Experiments measured the optical signatures of acoustic sources exciting the walls, ground, metal enclosures, trees and cars. In most experiments, an audio speaker was used as a source of acoustic signal. The speaker was driven by a sine wave created from a frequency generator at known frequencies or, alternatively connected to a source of acoustic voice signals.

Figure 3:
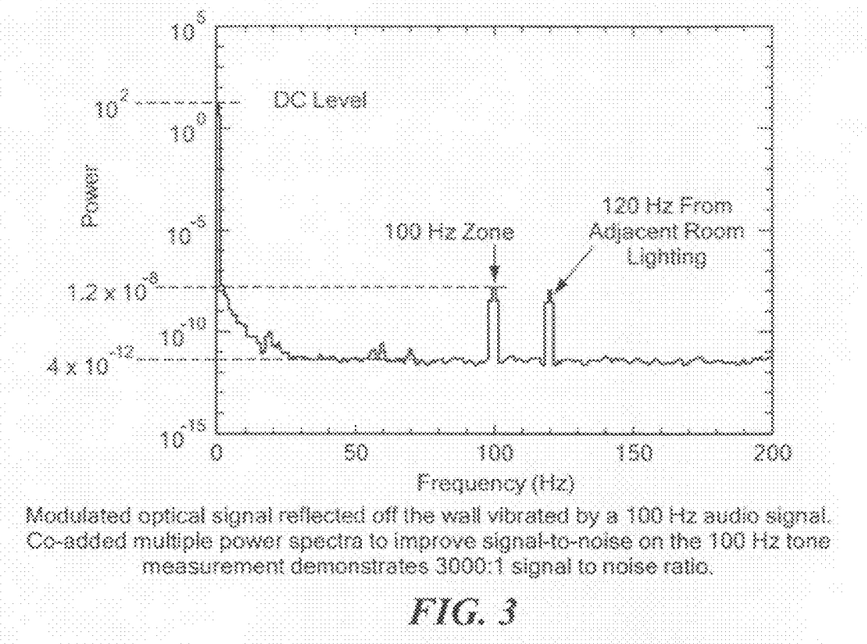
FIG. 3 is a graph depicting a modulated optical signal reflected off a wall vibrated by a 100 Hz audio signal detected in accordance with a sensor of the subject invention.

In one experiment a speaker, emitting a 100 Hz tone, was placed against the base of a wall (drywall painted a single color) with the speaker cabinet physically touching it. The wall was illuminated by a DC-powered light and the sensor measured the intensity of light scattered off the wall, at different angles. FIG. 3 shows the Power Spectrum Density (PSD) of a one second interval of optical data. The 100 Hz tone is easily detected in the PSD of the optical sensor signal. The noise floor, one peak, and signal background can be used to calculate the fraction of optical signal that is modulated. In this case, the DC signal to the noise floor in PSD space (power being proportional to signal amplitude squared) is about $2.5 \times 10^{13}$, and the 100 Hz tone to the noise floor is about 3000. This demonstrates the capability to measure at least a signal with amplitude modulation of less than $10^{-5}$ of the DC level $[(3000/2.5 \times 10^{13})^{1/2} = 10^{-5}]$.

Figure 4:
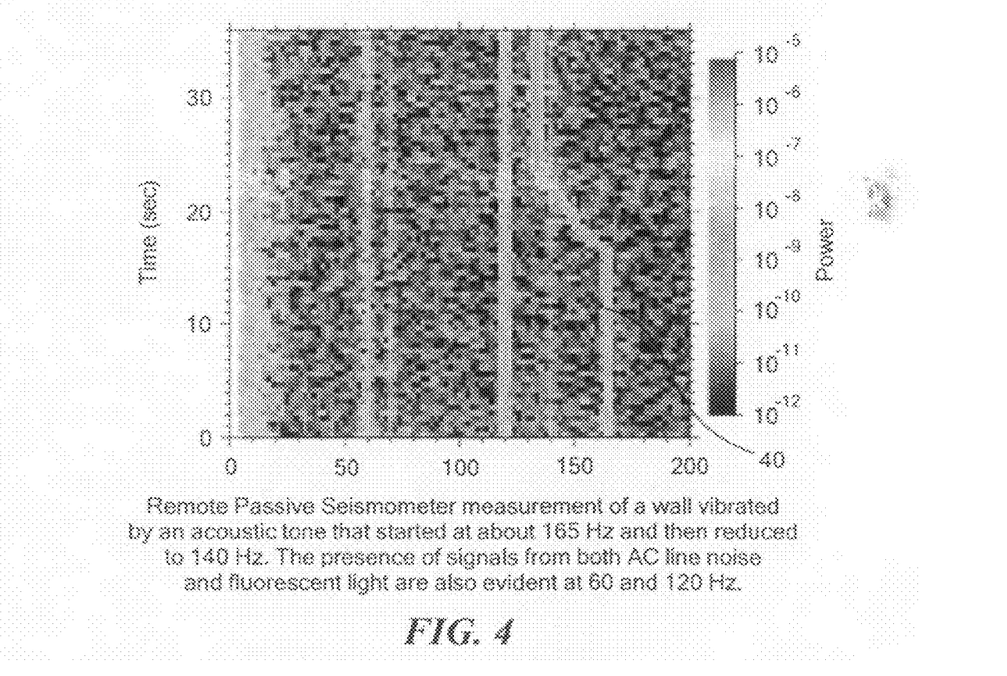
FIG. 4 is a graph showing a remote passive seismometer measurement of a wall vibrated by an acoustic tone in accordance with the subject invention.

This experiment demonstrates the basic concept of recovering surface acoustic motion from a reflected optical signal. Many similar measurements were conducted at different acoustic frequencies and under a variety of other conditions such as natural lighting and different fields of view. To visualize the frequency content of the optical signal, the sensor time signals were split into a series of short time intervals. The power spectral density of each short time series was calculated and then displayed as adjacent lines in an image. The result is a 'waterfall plot' of sensor signal PSDs as a function of time—analogous to a sonogram. An example is shown in FIG. 4. The X-axis is frequency—while the maximum frequency of this process is half the sampling frequency, or 5,000 Hz, this waterfall plot only shows the frequency range 0-200 Hz. The Y-axis is time—each of the power spectra time intervals is "stacked" so that power spectra from later times are shown at higher positions in the plot. The coloring of each point in this plot shows the value of the power spectral density at that frequency and time. The color scale is logarithmic, and the colors are related to actual power spectra values using the color key on the right. In this figure, a mechanical sound tone at about 165 Hz is detected. Then its frequency is slowly reduced to about 140 Hz. That tone vibrates the wall that modulates reflected light. This frequency change is clearly seen on the chart as the straight line 40 at 165 Hz that slopes off to the left. The waterfall plot also shows other spurious signals such as 60 and 120 Hz modulation due to tungsten and fluorescent room lighting.

Audio signals from inside a metal enclosure located outdoors under various conditions of sun and cloud conditions were also detected. The enclosure is painted with different color pigments in order to evaluate different surface reflective properties. Measurements were made at different distances and with both direct sunlight and cloudy sky conditions. Each test was performed with the audio signal both on and off, and with sensor viewing the enclosure and looking away from the enclosure. As expected, the sensor observed the effect of the audio signal under almost all conditions and distances when looking at the enclosure. When the audio was turned off, the signal was not present in the data. When the audio was still on and the sensor was pointed away from the enclosure, the signal modulation corresponding to the audio tone was not seen, thus indicating that the optical measurements were not contaminated by physical vibrations or audio pressure waves.

Figure 5A:
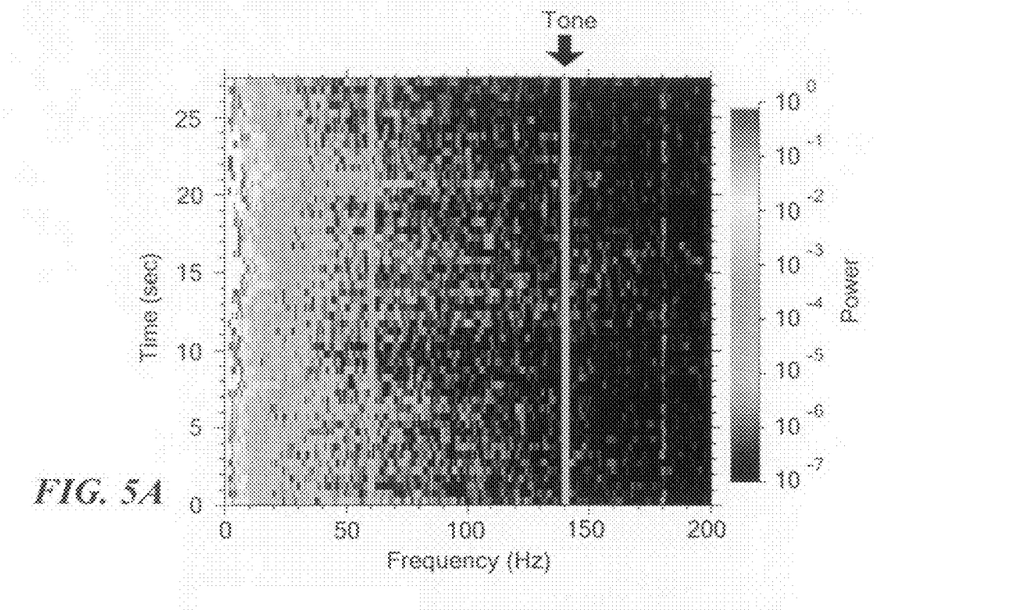
FIGS. 5A and 5B are graphs showing a 140 Hz audio tone inside a metal enclosure recovered via the remote optical measurement sensor in accordance with the subject invention.
Figure 5B:
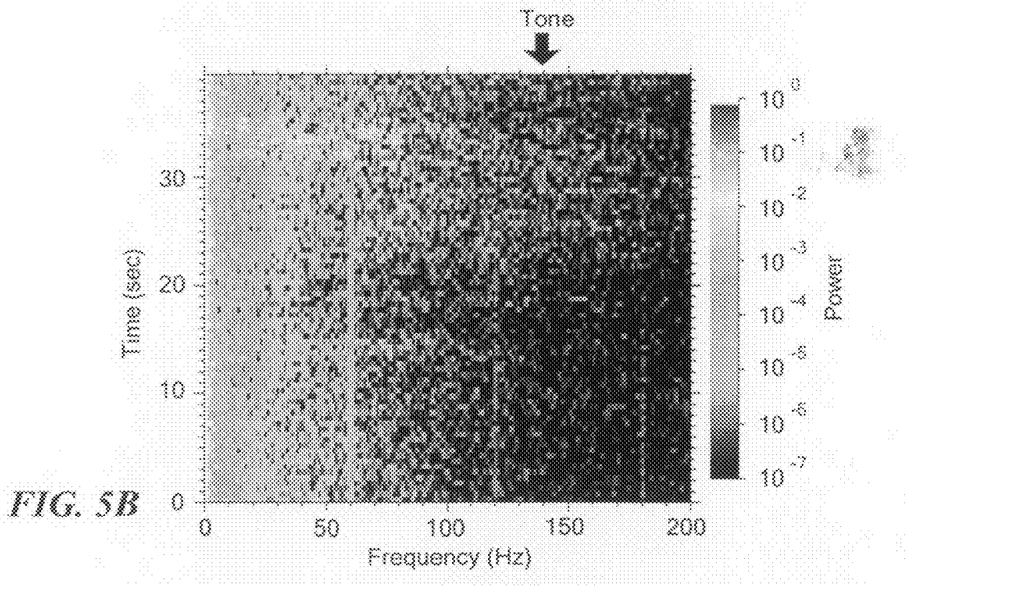
Figure 6A:
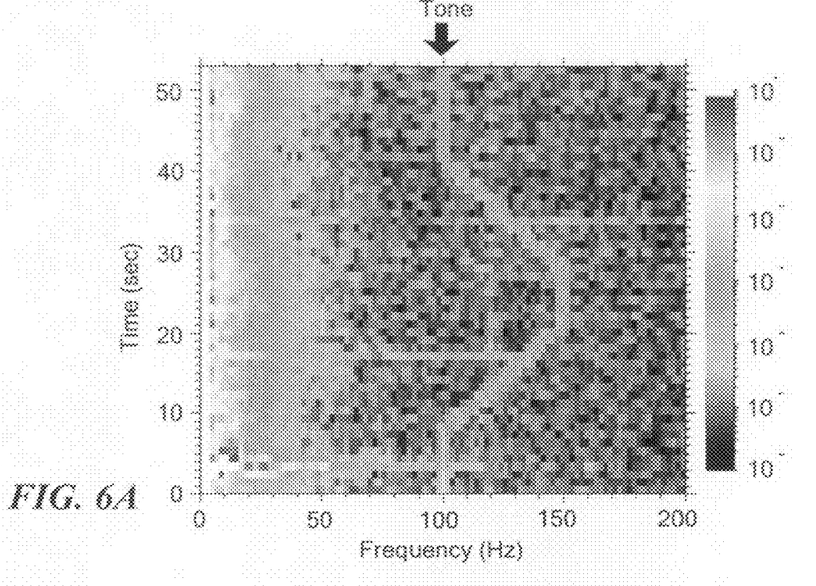
FIGS. 6A and 6B are graphs showing an audio tone in a metal enclosure varied from 100-150 Hz (FIG. 6A) and a range of frequency extracted from reflections off the enclosure while driven internally with a radio (FIG. 6B)
Figure 6B:
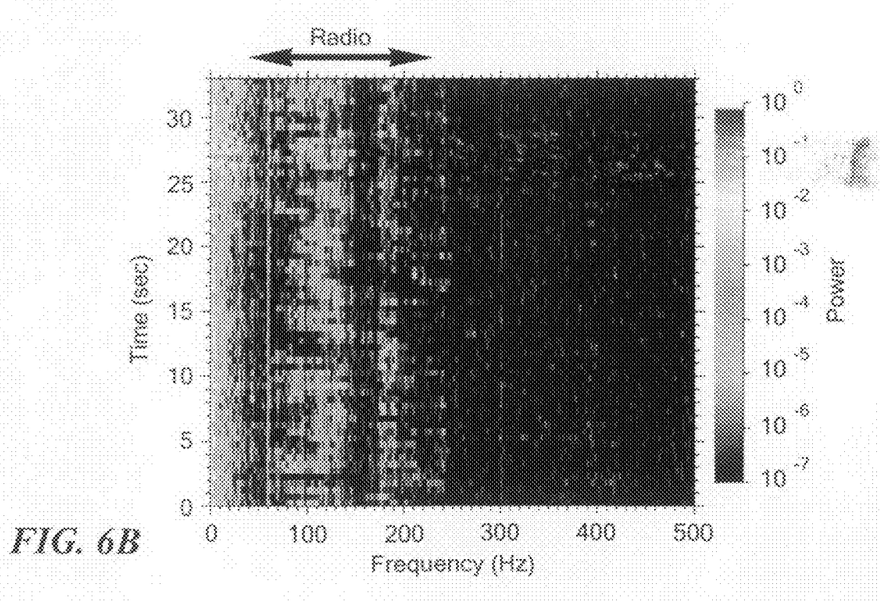

This is demonstrated in FIGS. 5A and 5B for a 140 Hz tone that was optically measured at a range of 60 feet. FIG. 6A shows the detected audio signal as it was changed from 100 Hz to 150 Hz and then back to 100 Hz from 24 feet. FIG. 6B is a direct optical extraction of audio from a radio station.

In a separate experiment the audio tone generator was replaced with a radio to produce a voice pattern. The sensor signal was filtered to remove components that clearly did not contribute to the unique features observed with the talk radio signal and converted to an audio file that can be played on a PC and listened to on speakers or headphones. Muffled voices are clearly present. With more sophisticated signal processing, it is possible to clear up the voice data so that they can be directly understood from the remotely acquired optical data. Similar measurements were conducted by observing a door of a car with the car radio was turned on. The sound vibrated the door, and the acoustic signal was retrieved from the remotely measured optical signal.

Figure 7A:
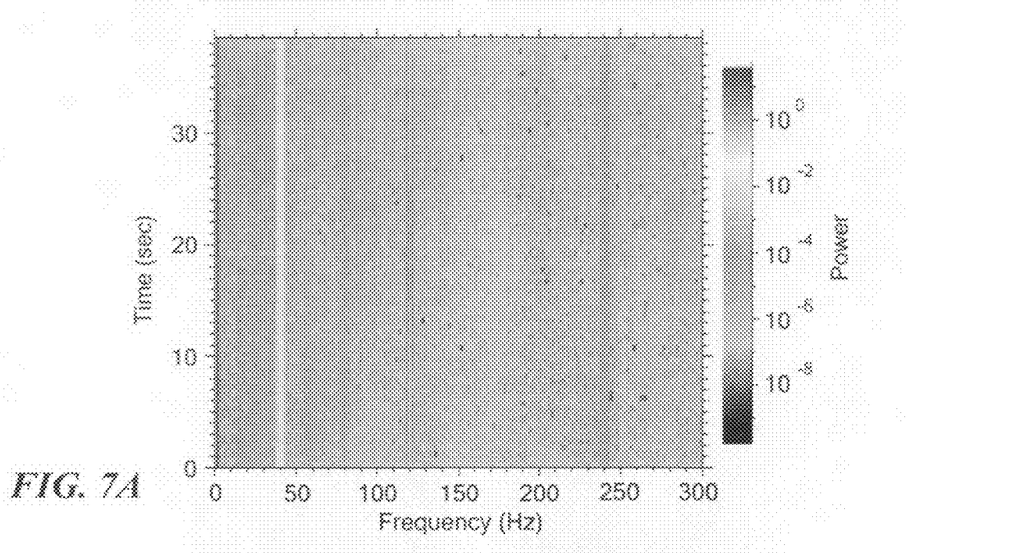
FIG. 7 is a graph showing simultaneous optical and accelerometer measurements of a window driven by a speaker at 40 Hz.
Figure 7B:
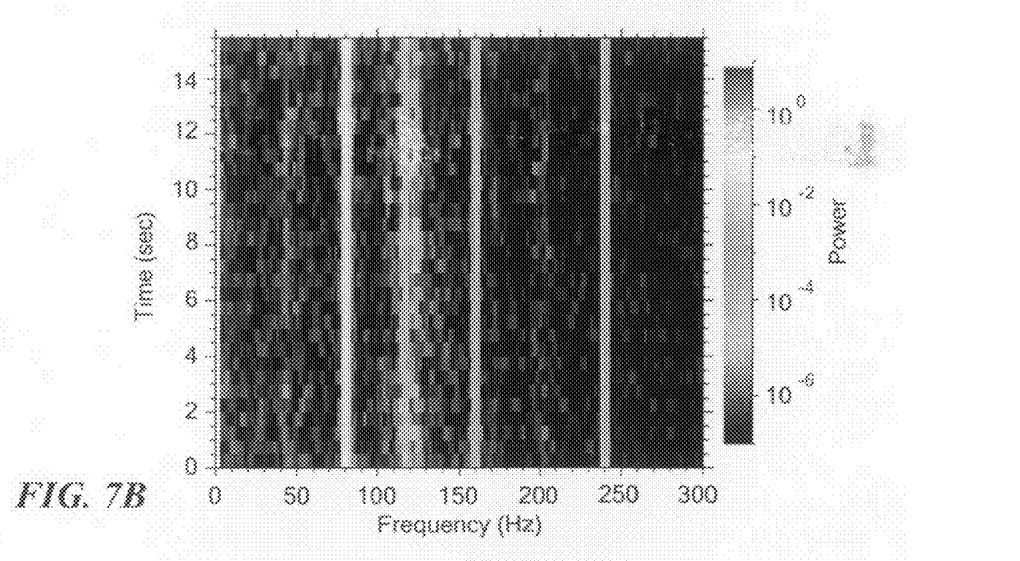

In other experiments, linear accelerometers were used to obtain independent vibration displacement information for the illuminated surface. One example measured displacement of a window near a speaker driven with a 40 Hz tone. The optical sensor was pointed to the window from the building exterior. Accelerometers on the window measured the actual vibrations simultaneously with the optical measurements. The optical signal (FIG. 7A) contained 40 Hz as well as some harmonics at 80, 120 and 240 Hz. The accelerometer measuring an axis perpendicular to window (FIG. 7B) shows 80 Hz as the largest harmonic (twice the frequency indicating accelerating from minimum to maximum and from maximum to minimum in one cycle). These measurements illustrate the complexity of the physical processes and show the need for careful laboratory experiments to characterize the effects.

Figure 8A:
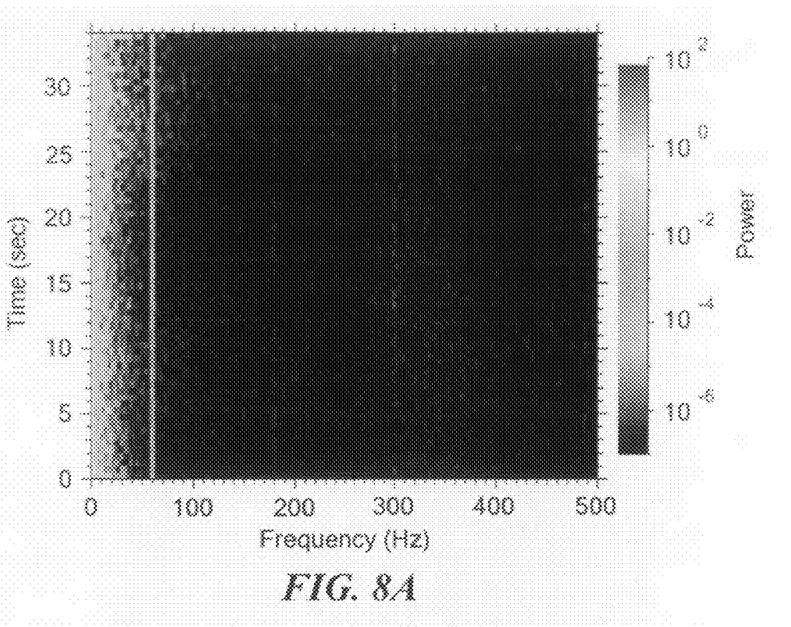
FIGS. 8A and 8B are plots showing measurements of a truck engine.
Figure 8B:
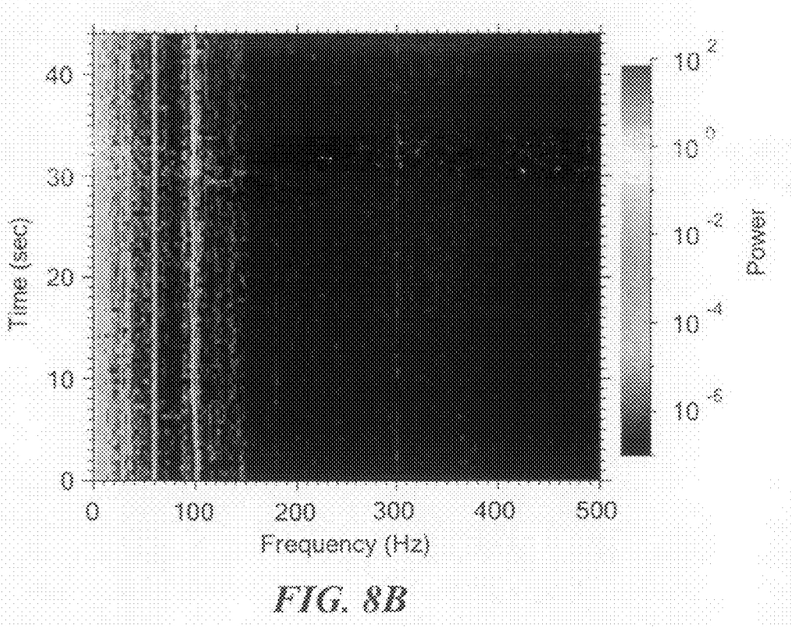

Additional measurements of diffuse reflections off vehicles with operating engines were made. Engine operation and some characteristics can be derived from the optical signals. FIG. 8A demonstrates observation of a truck engine being turned off. FIG. 8B shows a jumble of low frequency features observed when the engine is operating, including some stronger narrow features that are likely related to engine operating mode.

Figure 9:
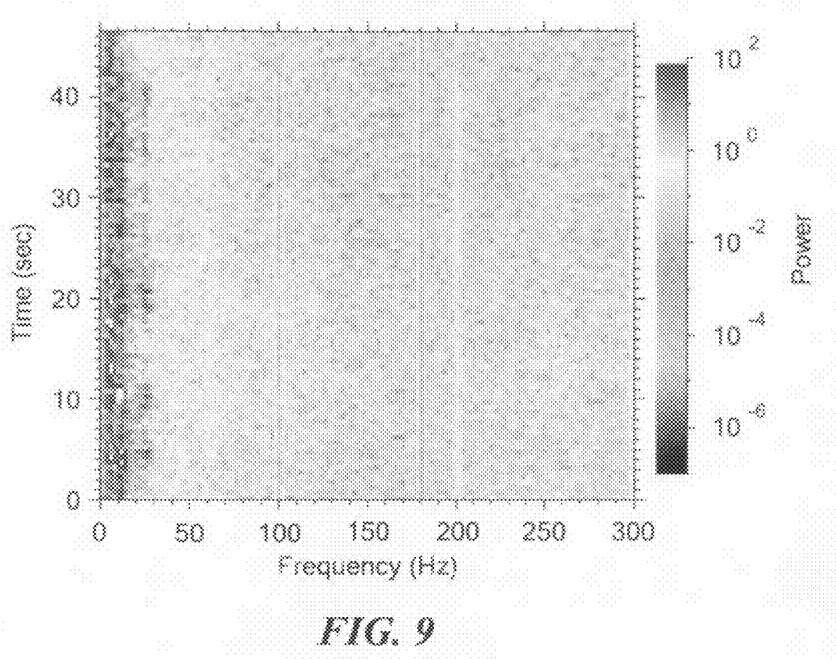
FIG. 9 is a plot showing a signal sensed by a sensor in accordance with the subject invention from the leaves of a tree next to a source generating a 100 Hz signal.

One more set of results are shown in FIG. 9. This test investigated if sound could be detected by observing vegetation (leaves) near the source. A speaker was placed next to a tree, driven by various frequency tones. The optical sensor, with about 1 deg FOV at 60 feet, was pointed at the leaves at different parts of a tree from the bottom to the treetop. The optical sensor signal contained modulation matching the driving audio frequency. There was little wind at the time of these measurements and it is unknown how wind would affect these detections.

Our experiments have so far demonstrated that there is a real and remotely measurable effect that is not an instrument artifact. Vibrations and acoustic signals can be optically detected from interior building walls, vibrations inside a building by observing an exterior wall surface, and sound by observing an outdoor metal surface from a distance, using either direct sunlight or diffuse illumination. It is also possible to detect audio signals (machinery and voices) using this technique. Distorted audio can be reconstructed with minimal processing.

The observed oscillations in intensity relate to the mechanical oscillations in the plane of the scattering surface. As an illustrative example of how this might work, consider basic geometry sketched in FIGS. 10A and 10B. We define the nominal scattering plane as being coincident with the x-y plane. The nominal normal vector lies along the z direction. An incident parallel beam, making an angle $\theta_i$ with respect to the z-axis, illuminates the surface with irradiance $I_0 \cos \theta_i$ (Watts cm$^{-2}$). In turn, the surface is viewed at an angle $\theta_v$ with respect to the z axis. To keep the example simple we take the observations to be in the same plane as defined by the incident beam and the z axis. Let us further assume, for this simple model only, that the light impinging on the surface is scattered in a Lambertian fashion with radiance $R=I_0 \cos \theta_i/\pi$ (Watts cm$^{-2}$ ster$^{-1}$), with respect to the z axis.

Figure 10A:
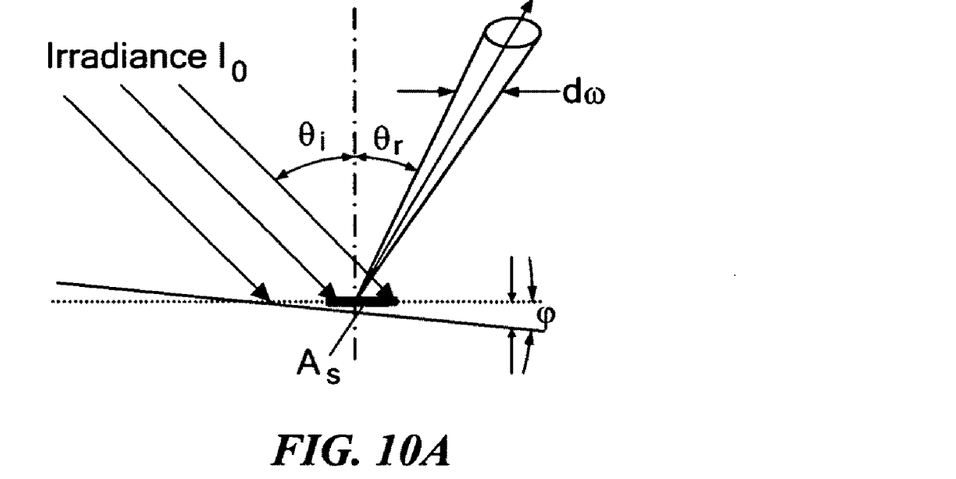
FIG. 10A is a highly schematic diagram showing a simplified geometry of reflections from the vibrating surface.
Figure 10B:
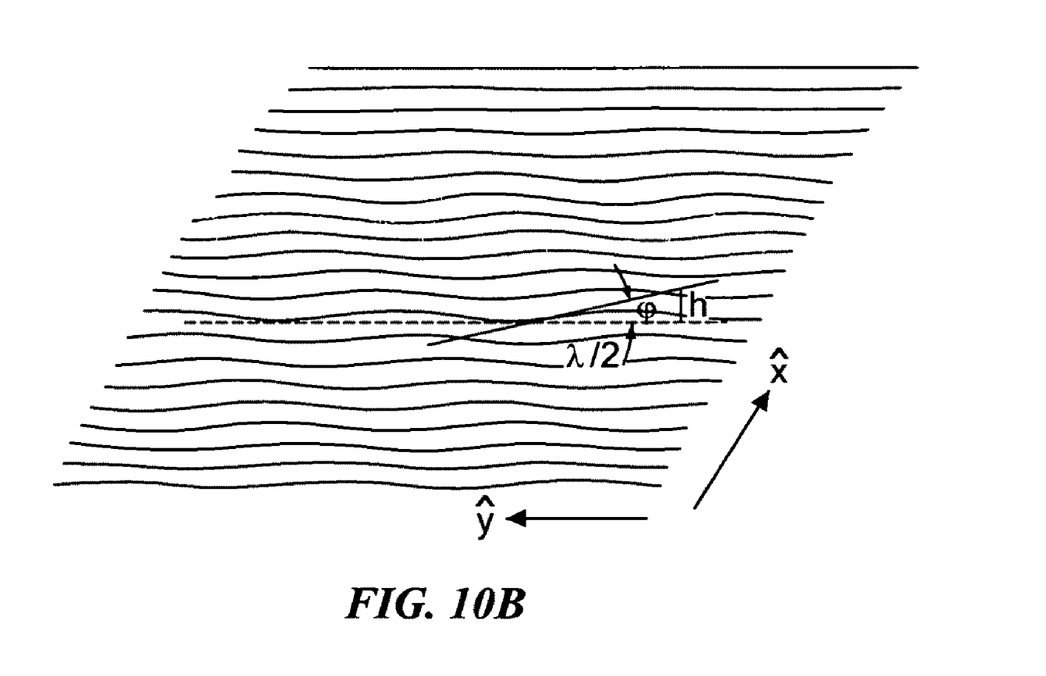
FIG. 10B is a highly schematic diagram showing a two-dimensional representation of an example of a vibrating surface.

The power, dP, going into a detector (with area $A_{det}$) at the viewing position will be:

$$dP=(I_0 \cos \theta_i/\pi)\cos \theta_v dA_s(A_{det}/D^2) \quad (1)$$

where $dA_s$ is an element of area on the scattering surface, $A_{det}$ is the collecting area of the detector, and D is the distance between the scattering element and the detector. The last term in parenthesis is just the solid angle, $d\Omega$, of the detector as seen from the scattering element. Since the quantity $\cos \theta_v dA_s/D^2$ is the solid angle of the scattering element, as seen from the detector, we can see that the radiance at the detector is just $$R=I_0 \cos \theta_i/\pi \quad (2)$$

as expected, and independent of the viewing angle $\theta_v$.

Now suppose that the surface element is oscillated through a small tilt angle that varies as $$\phi_{tilt}=\phi_0 \sin \omega t \quad (3)$$

The appropriate angle to use in place of $\theta_i$ in eq. (2) is $\theta_i-\theta_{tilt}$. In that case, the detected radiance is given simply by $$R=I_0 \cos(\theta_i-\phi_{tilt})/\pi \quad (4)$$

For small tilt angles, this expression reduces to $$R=I_0[\cos \theta_i+\sin \theta_i\phi_{tilt}]/\pi \quad (5)$$

Thus, the radiance at the detector varies very nearly linearly with the tilt angle. If the tilt angle varies sinusoidally, as suggested above, then the fractional amplitude in the modulated signal is $$\Delta R/R=(\tan \theta_i \sin \omega t)\phi_0 \quad (7)$$

For a numeric example, consider sound waves in a wall with frequency $\nu=300$ Hz, and displacement amplitude A=5 µm. Assume a value for the sound speed in the wall of $v_s=1000$ m/sec. The maximum slope of the wall away from its nominal plane is then $\phi_{max}=2\pi A/\lambda=2\pi A\nu/v_s$. If we plug in the illustrative numerical values, we find a maximum slope deviation for the wall of $10^{-5}$ (radians). For a typical illumination angle with $\tan \theta_i \sim 1$, this gives a fractional modulation amplitude of $10^{-5}$. Referring back to the results of the experiment shown in FIG. 3, we have detected signals with fractional modulation down to this level.

In the above calculations we assumed a simple illumination and detection geometry (e.g., that the detector lies in the scattering plane), and a simple Lambertian scattering law. We have also done simulations for other geometries and scattering laws.

The sensor could also include a two-dimensional imaging radiometer/camera including a multi-element FPA sensor. An off-the-shelf Hamamatsu 5×5 array of elements may be used. The silicon detector (visible passband) camera design includes a 4 kHz sample rate, up to 24 bit true dynamic range. The signals are $10^6$ below DC background (~20-bits). AC-coupling or offset subtraction is used to reject the large DC background. A camera with larger number of pixels is also possible if larger focal plane arrays are available: 20×20 or 32×32 or as large as practical. Numerous stabilization platforms are available for use with the camera.

Figure 11:
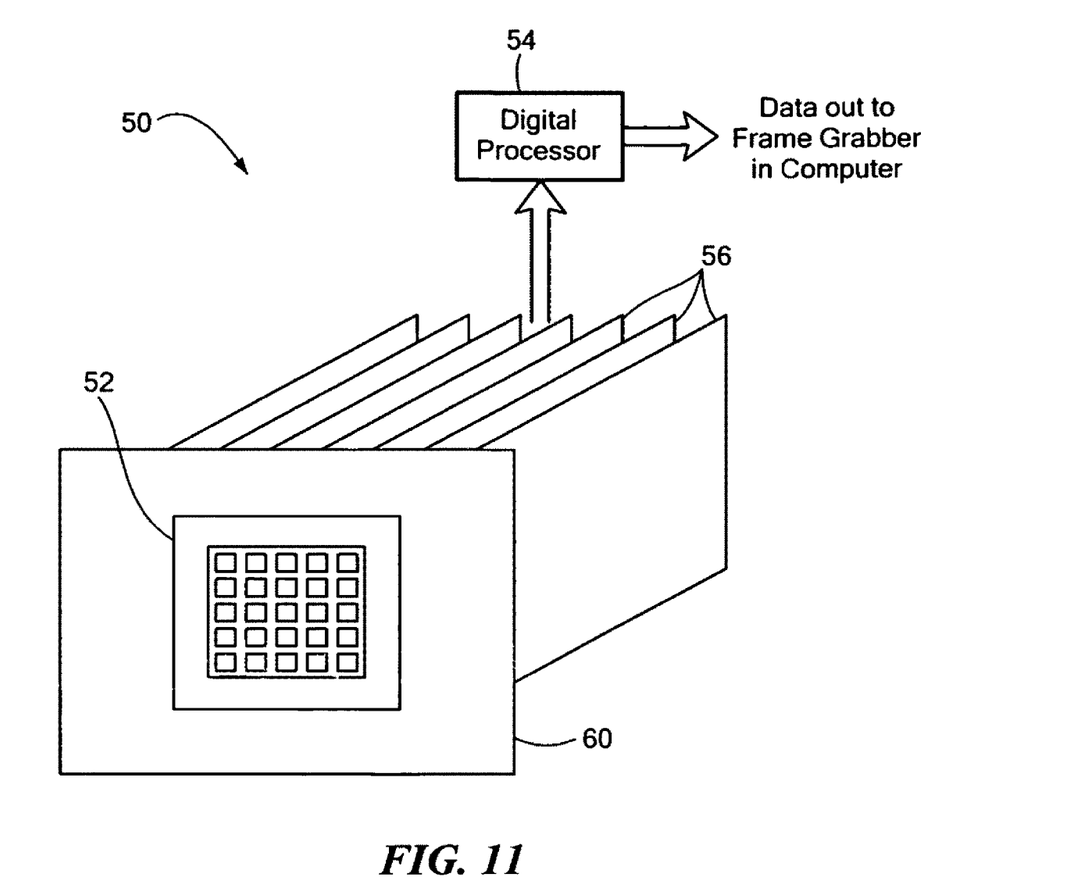
FIG. 11 is a highly schematic view of an imaging radiometer that may be used in accordance with the subject invention.

2D Camera 50, FIG. 11 includes Hamamatsu 5×5 Array 52, Digital Processor 54 and multi-channel boards 56 with 'n' channels each. Each channel has a transimpedance amplifier, AC-coupling and offset subtraction, and a 24-bit Σ-Δ ADC for each channel. A fiberglass-epoxy carrier 60 provides an interconnect from 25 detectors on the FPA to the multi-channel boards.

One aspect of this invention is to extract useful signals from the radiation intensity measurements. A standard approach to extracting frequency information from space-time domain is to use Fourier transforms. These hyper-temporal measurements require sophisticated methods to extract frequency information while simultaneously suppressing noise and background clutter. Sensor pointing stability plays a central role, since it can introduce a severe contamination to the frequency analysis.

An approach for recovering periodic signals buried in noise includes algorithms that describe a frequency division, energy comparison signal processing system for detecting the presence of, and separating the contributions from, sources that compose wide-band signals. The system divides at least part of a wide-band signal, for example, into a number of discrete narrow frequency band components, generates the energy envelope of each of these components, normalizes the envelopes and performs operations on these envelopes to identify frequency source characteristics and provides the source time behavior.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A passive, remote sensor comprising:
    an optical subsystem for receiving electromagnetic radiation scattered off a surface;
    at least a first detector responsive to electromagnetic radiation received by the optical subsystem and generating a composite signal comprising a DC current component and an AC current component;
    a filter which extracts the DC current component from the composite signal;
    a light emitting device driven by the DC current component;
    a second detector responsive to the light emitting device and connected to the first detector to subtract at least a portion of the DC component from the composite signal producing a modified signal; and
    an amplifier responsive to the modified signal for detecting vibrations of the surface.

2. The sensor of claim one in which the first and second detectors are photodetectors.

3. The sensor of claim 1 in which the light emitting device is a light emitting diode.

4. The sensor of claim 1 further including a fixed gain low pass filter responsive to the modified signal.

5. The sensor of claim 1 further including a variable gain low pass filter responsive to the modified signal.

6. The sensor of claim 1 in which said optical subsystem includes a telescope.

7. A passive, remote sensor comprising:
    an optical subsystem for receiving electromagnetic radiation scattered off a surface;
    at least a first detector responsive to electromagnetic radiation received by the optical subsystem and generating a composite signal comprising a DC current component and an AC current component;
    a DC current removal circuit for removing at least a portion of the DC current component of the composite signal producing a modified signal; and
    an amplifier responsive to the modified signal for detecting vibrations of the surface.

8. The sensor of claim 7 in which the DC current removal circuit includes:
    a light emitting device driven by the DC current component, and
    a second detector responsive to the light emitting device and connected to the first detector to subtract at least a portion of the DC component from the composite signal producing the modified signal.

9. A method of passively and remotely measuring vibrations based on electromagnetic radiation scattered off a vibrating surface, the method comprising:
    directing said electromagnetic radiation scattered off the vibrating surface to a detector which generates a composite signal in response to the electromagnetic radiation, the composite signal comprising a DC component and an AC component;
    removing the DC component to produce a modified signal; and
    amplifying the modified signal to detect vibrations of the surface.

10. The method of claim 9 in which acoustic waves vibrate the surface.

11. The method of claim 10 in which the acoustic waves are detected.

* * * * *